3,481,956
6-HALO-17α-ALKYL-9β,10α-PREGNANES
Andor Furst, Basel, and Marcel Müller, Frenkendorf, Switzerland, assignors to Hoffman-La Roche Inc., Nutley, N.J., a corporation of New Jersey
No Drawing. Filed May 31, 1967, Ser. No. 642,339
Claims priority, application Switzerland, June 10, 1966, 8,466/66
Int. Cl. C07c *169/66*; A61k *27/00*
U.S. Cl. 260—397.3          7 Claims

ABSTRACT OF THE DISCLOSURE 6-halo-17α-lower alkyl-9β,10α-pregnanes are prepared from 17α-lower alkyl-9β,10α-pregnane 3,5-enolates. The end products are useful as progestational agents and as inhibitors of fertility.

Detailed description of the invention

This invention relates to compounds of the formula:

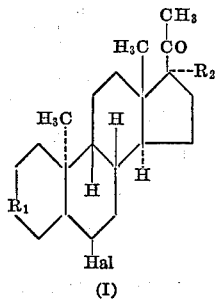

(I)

wherein $R_1$ is a 3-keto-4-dehydro-, 3-keto-4,6-bisdehydro-, 3-keto-1,4-bisdehydro-, 3-keto-1,4,6-trisdehydro-, 3-alkoxy- or 3-acyloxy-3,5-bisdehydro or 3-acyloxy-2,4,6-trisdehydro-system, $R_2$ is lower alkyl and Hal is fluorine, chlorine or bromine.

The compounds of Formula I can be denoted as 9β,10α-steroids by which is meant that the hydrogen atoms of positions 8 and 9, as well as the 13-methyl group, exhibit β-configuration and the 14-hydrogen atom and the 10-methyl group exhibit α-configuration. The difference from the normal steroid series accordingly exists with reference to the configuration of the 9-hydrogen atom and the 10-methyl group. Thus these 9β,10α steroids have a different planar configuration than the normal steroids possessing a B/C cis-ring junction in contrast to the B/C trans-ring junction of the normal steroids.

As used herein the term "lower alkyl" as a meaning of $R_2$ comprehends saturated, branched or straight chain hydrocarbon moieties such as methyl, ethyl, t-butyl and the like. Those having 1–4 carbon atoms are preferred.

The alkyl group in a 3-alkyloxy group which can be present in a 3-alkoxy-3,5-bisdehydro system is an aliphatic, cycloaliphatic or araliphatic alkyl group with 1–10 carbon atoms such as methyl, ethyl, propyl, t-butyl, cyclopentyl, cyclohexyl, benzyl and the like.

The acyl group in a 3-acyloxy group comprehended by the symbol $R_1$ is that derived from a saturated or unsaturated aliphatic, cycloaliphatic, araliphatic or aromatic carboxylic acid with 1–20 carbon atoms such as: formic acid, acetic acid, pivalic acid, propionic acid, butyric acid, caproic acid, enanthic acid, oleic acid, palmitic acid, stearic acid, succinic acid, malonic acid, citric acid, benzoic acid.

In the 6,7 saturated compounds of Formula I, the 6-halogen atom can be in the α- or β-position.

Exemplary compounds of Formula I, obtainable by the processes hereinafter described and exemplified, are the following:

6β-chloro-17α-methyl-9β,10α-pregn-4-ene-3,20-dione
6α-chloro-17α-methyl-9β,10α-pregn-4-ene-3,20-dione
6-chloro-17α-methyl-9β,10α-pregna-4,6-diene-3,20-dione
6β-chloro-17α-methyl-9β,10α-pregna-1,4-diene-3,20-dione
6-chloro-17α-methyl-9β,10α-pregna-1,4,6-triene-3,20-dione
6α-fluoro-17α-methyl-9β,10α-pregn-4-ene-3,20-dione
6β-fluoro-17α-methyl-9β,10α-pregn-4-ene-3,20-dione
6-fluoro-17α-methyl-9β,10α-pregna-4,6-diene-3,20-dione
6-fluoro-17α-methyl-9β,10α-pregna-1,4,6-triene-3,20-dione
6β-bromo-17α-methyl-9β,10α-pregn-4-ene-3,20-dione
6-bromo-17α-methyl-9β,10α-pregna-4,6-diene-3,20-dione
6-bromo-17α-methyl-9β,10α-pregna-1,4,6-triene-3,20-dione
6β-chloro-17α-ethyl-9β,10α-pregn-4-ene-3,20-dione
6α-chloro-17α-ethyl-9β,10α-pregn-4-ene-3,20-dione
6β-chloro-17α-ethyl-9β,10α-pregna-1,4-diene-3,20-dione
6-chloro-17α-ethyl-9β,10α-pregna-4,6-diene-3,20-dione
6-chloro-17α-ethyl-9β,10α-pregna-1,4,6-triene-3,20-dione
6α-fluoro-17α-ethyl-9β,10α-pregn-4-ene-3,20-dione
6β-fluoro-17α-ethyl-9β,10α-pregn-4-ene-3,20-dione
6-fluoro-17α-ethyl-9β,10α-pregna-4,6-diene-3,20-dione
6-fluoro-17α-ethyl-9β,10α-pregna-1,4,6-triene-3,20-dione
6-bromo-17α-ethyl-9β,10α-pregn-4-ene-3,20-dione
6-bromo-17α-ethyl-9β,10α-pregna-4,6-diene-3,20-dione
6-bromo-17α-ethyl-9β,10α-pregna-1,4,6-triene-3,20-dione
3-ethoxy-6-chloro-17α-methyl-9β,10α-pregna-3,5-dien-20-one
3-acetoxy-6-chloro-17α-methyl-9β,10α-pregna-3,5-dien-20-one
3-acetoxy-6-chloro-17α-methyl-9β,10α-pregna-2,4,6-trien-20-one
3-acetoxy-6-fluoro-17α-methyl-9β,10α-pregna-2,4,6-trien-20-one
3-ethoxy-6-fluoro-17α-methyl-9β,10α-pregna-3,5-dien-20-one The compounds of Formula I can be prepared according to methods known per se for the preparation of corresponding 6-halo steroids of normal stereoconfiguration.

One preferred method of preparation consists in halogenating a 9β,10α steroid of the formula.

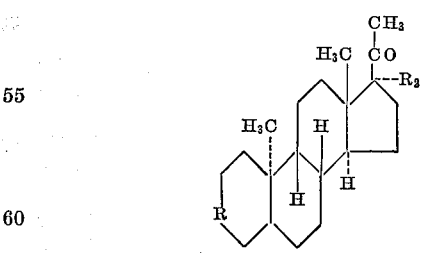

(II)

wherein R is a 3-keto-4-dehydro-, 3-keto-4,6-bisdehydro, 3-alkoxy-3,5-bisdehydro or 3-acyloxy-3,5-bisdehydro system and $R_2$ is lower alkyl.

The above halogenation to place a halogen atom in the 6-position of the compound of Formula II can be effected according to methods known for 6-halogenation of steroids of normal stereoconfiguration. Subsequent to this halogenation the so-obtained 6-halo product can be dehydrogenated or transformed into a 3-enol ether or 3-enol acylate.

Illustrative known methods which can be used for the 6-halogenation of a compound of Formula II to prepare a compound of Formula I are as follows:

(a) A compound of formula

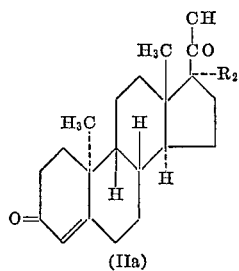

(IIa)

wherein $R_2$ has the same meaning as above, is treated with a halogenating agent such as an N-halo-imide (e.g. N-bromosuccinimide) or with a halogen (e.g. with elemental bromine) [see J. Am. Chem. Soc. 72, 4534 (1950)].

(b) A compound of the formula

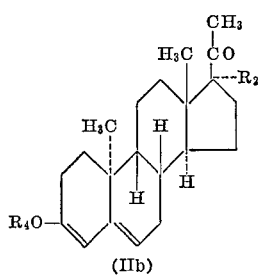

(IIb)

wherein $OR_4$ is alkyloxy or acyloxy and $R_2$ has the same meaning as above, is treated with chlorine or bromine [J. Am. Chem. Soc. 82, 1230 (1960)], with an N-halo-imide [J. Am. Chem. Soc. 82, 1230 (1960); 77, 3827 (1955)] or with perchloryl fluoride [J. Am. Chem. Soc. 81, 5259 (1959); Chem and Ind. (1959) 1317].

These procedures indicated under (b) above are especially suitable for the preparation of 6-fluoro (chloro- or bromo-)-9$\beta$,10$\alpha$-3-keto-$\Delta^4$-pregnanes of Formula I.

The 6-fluoro derivatives are preferably prepared by reacting a compound of Formula IIb with perchloryl fluoride, suitably in dioxane/water or acetone/ethanol in the presence of alkali acetate. This fluorination procedure leads to a mixture of the 6$\beta$- and 6$\alpha$-fluoro isomers, the 6$\alpha$-fluoro isomer being quantitatively predominant. The two isomers can be separated from each other by conventional means, for example, by chromatography and/or fractional crystallization. Moreover the $\alpha$-isomer can be converted to the more stable $\beta$-isomer by isomerization with a hydrohalic acid (e.g. hydrogen chloride or hydrogen bromide in acetic acid, chloroform, ethanol or dioxane).

The 6-chloro derivatives are preferably prepared by treating a compound of Formula IIb with a chlorinating agent such as chlorine, N-chloroacetamide or N-chlorosuccinimide. Once again the mixture of 6$\alpha$- and 6$\beta$-isomers thus obtained can be separated by conventional means, for example, chromatography and/or fractional crystallization. Also the 6$\alpha$-isomer can be isomerized to the 6$\beta$-isomer by the above-described means.

The 6-bromo derivatives are preferably prepared in a manner analogous to the 6-chloro derivatives. Also the separation of the so-obtained isomers as well as the isomerization of the 6$\alpha$-bromo to the 6$\beta$-bromo derivative can be effected in an analogous manner.

(c) A compound of the formula

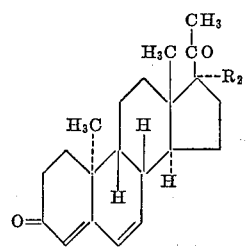

(IIc)

wherein $R_2$ has the same meaning above, is treated with chromyl chloride (for example in accordance with the procedures of U.S. Patent No. 3,076,823) and water is then split off from the so-formed 7-OH compound to yield the desired 6-halo derivative.

The reaction of compound of Formula IIc with chromyl chloride can be suitably effected in anhydrous solvents such as chloroform or carbon tetrachloride. The dehydration of the so-formed 6-chloro-7-hydroxy derivative can be carried out in acidic media (e.g. hydrogen chloride or hydrogen bromide in acetic acid, acetone, methanol, dioxane or tetrahydrofuran).

(d) In another procedure a compound of Formula IIc is treated with a peracid such as perphthalic acid yielding an epoxy steroid of the formula

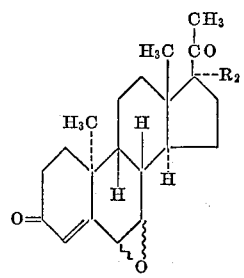

(IId)

wherein $R_2$ has the same meaning above, the epoxy steroid of Formula IIb is then treated with hydrogen fluoride, chloride or bromide [Chem. Ber. 94, 1225 (1961)] and water is split from the so-obtained 6-halo-7-hydroxy reaction product.

The epoxy steroid of Formula IId can also be prepared from the 6-chloro-7-hydroxy compounds, the preparation of which is described under (c) above by treatment thereof with alkali.

For the conversion of 6,7-saturated 6-halo products of Formula I into corresponding compounds having a $\Delta^6$-double bond the following procedures can be used:

(e) A compound of the formula

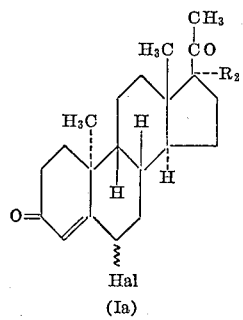

(Ia)

wherein Hal and $R_2$ have the same meaning as above, can be dehydrogenated in the 6,7-position with a substituted benzoquinone such as chloranil [J. Am. Chem. Soc. 82, 4293 (1960); 81, 5951 (1959)] or with 2,3-dichloro-5,6-dicyanobenzoquinone or with manganese dioxide [J. Am. Chem. Soc. 75, 5932 (1953)].

(f) A compound of the formula

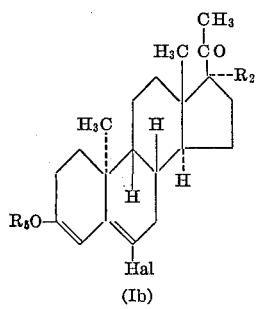

(Ib)

wherein $OR_5$ is an etherified hydroxy group, especially a 3-alkoxy group of the type discussed heretofore with respect to compounds of Formula I and Formula II; and Hal has the same meaning as above, is converted into a corresponding 6-halo-9β,10α-Δ$^{4,6}$-3-ketone by reaction with 2,3-dichloro-5,6-dicyanobenzoquinone or manganese dioxide.

A Δ$^1$-double bond can be introduced into the 6-halo products of Formula I as follows:

(g) A compound of formula Ia or of the formula

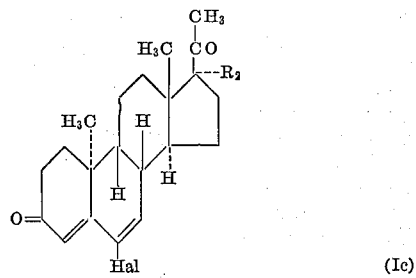

(Ic)

wherein Hal and $R_2$ have the same meaning as above, can be dehydrogenated in the 1,2-position by microbiological means or with dehydrogenating agents such as iodine pentoxide, periodic acid or selenium dioxide [J. Am. Soc. 81, 1235; 5951 (1959)], with 2,3-dichloro-5,6-dicyanobenzoquinone [Proc. Chem. Soc. (1960) 14], with lead tetraacetate [J. Am. Chem. Soc. 77, 661 (1955)] or with chloranil [J. Am. Chem. Soc. 82, 4293 (1960)].

Direct introduction of double bonds in both the 1,2- and 6,7-positions can be effected by treating the Δ$^4$-compounds with 2,3-dichloro-5,6-dicyanobenzoquinone or chloranil thereby directly yielding Δ$^{1,4,6}$-derivatives.

Methods known and used therefor with steroids of normal stereoconfiguration can also be used with the compounds of Formula I for the enol etherification of the 3-keto-Δ$^4$-system and the enol esterification of the 3-keto-Δ$^4$- and the 3-keto-Δ$^{4,6}$-system.

For example, the enol etherification of 6-halo-9β,10α-3-keto-Δ$^4$-pregnanes of Formula I for the purpose of introducing the 3-alkoxy Δ$^{3,5}$-system can be effected as follows:

(h) A 3-keto-Δ$^4$-pregnane of Formula I is reacted with an alcohol (e.g. a lower alkanol such as methanol or ethanol or an ar-lower alkanol such as benzyl alcohol) in the presence of a catalyst (e.g. p-toluenesulfonic acid) or with an orthoformate in the presence of a catalyst (e.g. with ethyl orthoformate and hydrochloric acid) or with a dialkoxypropane (e.g. dimethoxy-propane) in methanol/dimethylformamide in the presence of a catalyst (such as p-toluenesulfonic acid).

The enol esterification of the 3-keto-Δ$^4$- and 3-keto-Δ$^{4,6}$-9β,10α-pregnanes of Formula I and also the esterification of free hydroxy group in the 3-position can be effected by treatment thereof with an acylating agent in the presence of a catalyst (e.g. with isopropenyl acetate in the presence of p-toluenesulfonic acid).

Compounds of Formula II utilized as starting materials are a known class of compounds and insofar as any particular member is not known, it can be prepared according to methods known per se and utilized for the preparation of other members of the class.

The compounds of Formula I are useful by virtue of their hormonal activity. They are useful as progestational agents and inhibitors of fertility. The compounds of Formula I are distinguished from the corresponding steroids of normal stereoconfiguration in that their in vivo metabolism is different. They do not reach the body's own hormone pool. They display specific hormonal activities, for example, progestational properties and fertility inhibiting action. Moreover they influence gonadotropin secretion and/or production. Their useful hormonal properties are manifested upon administration to warm blooded mammals, for example, when administered in oral dosage of from about 0.01 mg./kg. to about 0.05 mg./kg. or in parenteral dosages of about 0.001 mg./kg. to about 0.005 mg./kg. to rabbits, their progestational activity is manifested by stimulation of endometrial proliferation in juvenile females after estrogen priming (Clauberg test) and of deciduoma formation in pseudopregnant rats.

The compounds of Formula I can be used in form of conventional pharmaceutical preparations, suitable dosage units being from about 2–50 mg. Suitable dosage regimens in warm blooded mammals are from about 0.01 mg./kg. per day to about 1.0 mg./kg. per day, but for any particular subject the specific dosage regimen should be adjusted according to individual need and the professional judgment of the person administering or supervising the administration of the compound of Formula I. The conventional pharmaceutical preparations containing the compounds of Formula I can contain them in admixture with conventional organic or inorganic inert carrier materials suitable for enteral or parenteral administration such as, for example: water, gelatin, lactose, starch, talc, vegetable oils, gums, polyalkyleneglycols, Vaseline and the like.

The preparations can be in conventional solid forms such as, tablets, dragees, suppositories, capsules or in conventional liquid forms, such as, solutions, suspensions or emulsions. They can be subjected to conventional pharmaceutical expedients, such as, sterilization and/or contain conventional pharmaceutical additives, such as, preservatives, stabilizing agents, wetting or emulsifying agents, salts for adjusting the osmotic pressure of buffers. They can also contain other active ingredients, including other hormonally active ingredients.

The following examples are illustrative of the invention, but not limitative thereof. All temperatures are stated in degrees centigrade.

Example 1

A solution of 20.0 g. of 3-acetoxy-17α-methyl-9β,10α-pregna-3,5-dien-20-one in 300 ml. of absolute ether is added with stirring to a solution of 40.0 g. of potassium acetate in 700 ml. of acetic acid and 120 ml. of water. The mixture is then cooled to 0°–5° and a solution of 3.5 g. of chlorine in 120 ml. of acetic acid is added dropwise with stirring and cooling. The mixture is subsequently stirred at 0° for a further 10 minutes, then poured into water and extracted with ether. The ether extracts are washed neutral with sodium bicarbonate solution and water, and then dried over sodium sulfate. After evaporating off the solvent, the resultant 6β-chloro-17α-methyl-9β10α-pregn-4-ene -3,20- dione is recrystallized from acetone/isopropyl ether. UV absorption: $\epsilon_{235}$ 15,500. Melting point 147–148°; $[\alpha]_D^{25} = -86°$ (dioxan).

The 3 - acetoxy-17α-methyl-9β,10α-pregna-3,5-dien-20-one used as the starting material can be obtained as follows:

A solution of 40 ml. of isoproppenyl acetate in 80 ml. of benzene is added dropwise within 3 hours to a solution of 1.0 g. of 17α-methyl-9β,10α-pregn-4-ene-3,20-dione and 0.1 g. of p-toluenesulfonic acid in 40 ml. of absolute benzene, while 80 ml. of benzene are simultaneously distilled off via a Vigreux column. The cooled reaction mixture is treated with 0.1 ml. of pyridine, the precipitate which separates out is filtered off and the filtrate is concentrated in vacuum. Recrystallized from ispropyl ether, the residue yields 3-acetoxy-17α-methyl-9β,10α - pregna - 3,5 - dien - 20 - one. UV absorption: $\epsilon_{235}$ 18,000. Melting point 108–110°; $[\alpha]_D^{25} = +97°$ (dioxan).

Example 2

A mixture of 4.2 g. of 6β-chloro-17α-methyl-9β,10α-pregn-4-ene-3,20-dione, 230 mg. of p-toluenesulfonic acid, 3.6 g. of ethyl orthoformate and 60 ml. of dioxane is allowed to stand at room temperature in the dark for 16 hours. This solution is added dropwise in the course of 5 mintues to a well stirred mixture of 240 ml. of glacial acetic acid, 17 ml. of water and 21.0 g. of manganese dioxide. The reaction is then stirred at 25° for 60 minutes, thereafter the manganese dioxide is filtered off and then thoroughly washed with glacial acetic acid and methylene chloride. The filtrate is poured into ice-water and extracted with methylene chloride/petroleum ether (1:1). The organic extract is washed with sodium carbonate solution and water, dried with sodium sulfate and evaporated. The residue (4.0 g.), dissolved in benzene, is filtered through 50 g. of aluminum oxide. The 6 - chloro - 17α - methyl - 9β,10α - pregna - 4,6 - diene-3,20-dione obtained from the eluate is recrystallized from acetone/isopropyl ether. UV absorptions $\epsilon_{286}$ 21,900. Melting point 177–178°; $[\alpha]_D^{25} = -381°$ (dioxan).

Example 3

A solution of 1.7 g. of 6-chloro-17α-methyl-9β,10α-pregna-4,6-diene-3,20-dione and 1.6 g. of 2,3-dichloro-5,6-dicyanobenzoquinone in 180 ml. of dioxane is heated to reflux under a nitrogen atmosphere for 5 hours. The reaction mixture is then diluted with 200 ml. of benzene and filtered through 30 g. of aluminum oxide (activity II). The substance is completely eluted with ether. The eluate is evaporated yielding 1.4 g. of crude product which is chromatographed aluminum oxide. The petroleum ether/benzene fractions yield purified 6-chloro-17α-methyl-9β,10α-pregna-1,4,6-triene-3,20-dione. UV absorption: $\epsilon_{228}$ 11800, $\epsilon_{251}$ 10,800, and $\epsilon_{300}$ 10,400. Melting point 221–222°; $[\alpha]_D^{25} = -220°$ (dioxan).

Example 4

A solution of 42.0 g. of chromyl chloride is added with stirring and under a nitrogen atmosphere in the course of 3 minutes to a solution (cooled to −15°) of 25.0 g. of 17α-methyl-9β,10α-pregna-4,6-diene-3,20-dione in 1200 ml. of methylene chloride. The reaction mixture is then stirred at −15° for a further 2 hours. The resultant brown-red precipitate is then filtered off, washed with a little methylene chloride and subsequently introduced portionwise with stirring into a solution of 150 g. of sodium acetate and 185 g. of sodium pyrosulfite in 3000 ml. of ice-water. After the addition of 3000 ml. of ethyl acetate, the reaction mixture is further stirred for 20 minutes. The organic phase is separated off, washed with sodium acetate solution and sodium chloride solution, dried over sodium sulfate and evaporated in vacuum. The residue is then dissolved in 400 ml. of dioxane and 100 ml. of methylene chloride and after the addition of 50 ml. of hydrocholic acid/dioxane (13 percent mg.), stirred for 4 hours at room temperature. The reaction solution is then poured into ice-water and extracted with ethyl acetate. The organic extract yields 19 g. of crude product which is chromatographed on silica gel. Purified 6-chloro-17α-methyl-9β,10α-pregna-4,6-diene-3,20 - dione is eluted with benzene/acetone 9:1.

Example 5

15.0 g. of 3-acetoxy-17α-methyl-9β,10α-pregna-3,5-dien-20-one in a solution of 8.0 g. of anhydrous potassium acetate in 350 ml. of acetone and 250 ml. of ethanol, is treated with perchloryl fluoride for 6 hours at room temperature. The reaction mixture is diluted with water and extracted with methylene chloride. The extracts are washed with water, dried over sodium sulfate and evaporated, yielding 15.5 g. of crude product which is chromatographed on silica gel. The methylene chloride/acetone (97:3) fractions first yield 6α-fluoro-17α-methyl-9β,10α-pregn-4-ene-3,20-dione. UV absorption: $\epsilon_{233}$ 13,300.

The later fractions yield purified 6β-fluoro-17α-methyl-9β,10α-pregn-4-ene-3,20-dione. UV absorption: $\epsilon_{234}$ 16,400.

Example 6

4.0 ml. of ethyl orthoformate and 150 mg. of p-toluenesulfonic acid are added to a solution of 4.5 g. of 6β-fluoro-17α-methyl-9β,10α-pregn-4-ene-13,20-dione in 100 ml. of absolute dioxane and the solution is then held at room temperature for 15 hours. The solution is then diluted with 150 ml. of acetone and cooled to 0°. A solution of 1.5 g. of sodium acetate in 20 ml. of water, 4.0 g. of N-bromosuccinimide and 2 mil. of acetic acid are then successively added with stirring. The reaction mixture is further stirred for 30 minutes, diluted with water and extracted with methylene chloride. The extracts are washed with dilute sodium hydroxide scolution and water to neutral and then evaporated to dryness. The resultant product is heated with 8 ml. of pyridine at 90° for 45 minutes. The reaction mixture is poured on ice water, extracted with methylene chloride, washed and dried, yielding 4.0 g. of crude product which is chromatographed on silica gel. The fractions which contain a single compound according to thin layer chromatogram are recrystallized from acetone/isopropyl ether and yield 6-fluoro-17α-methyl-9β 10α-pregna-1,4,6-triene-3,20-dione UV absorption: $\epsilon_{285}$ 24,000.

Example 7

6-fluoro-17α-methyl-9β,10α-pregna-4,6-diene-3,20-dione is dehydrogenated with 2,3-dichloro-5,6-dicyanobenzoquinone in accord with the procedure of Example 3. The 6 - fluoro - 17α - methyl - 9β,10α - pregna - 1,4,6 - triene-3,20-dione obtained after chromatography of the crude product exhibits three maxima in the UV spectrum: $\epsilon_{228}$ 11,600, $\epsilon_{255}$ 10,500, $\epsilon_{301}$ 10,200.

Example 8

A mixture of 1.0 g. of 6-chloro-17α-methyl-9β,10α-pregna-4,6-diene-3,20-dione, 100 mg. of p-toluenesulfonic acid, 60 ml. of benzene and 30 ml. of isopropenyl acetate is heated to reflux at the water-separator for 6 hours. The reaction mixture is then diluted with 50 ml. of petroleum ether and chromatographed through 10 g. of aluminum oxide yielding 3-acetoxy-6-chloro-17α-methyl-9β,10α-pregna-2,4,6-trien-20-one in the form of yellowish crystals which are recrystallized from methanol containing 0.5 per cent pyridine. UV absorption: $\epsilon_{303}$ 13,000.

Example 9

This example illustrates typical pharmaceutical formulations incorporating as active ingredient 6-chloro17α methyl-9β,10α-pregna-1,4,6-triene-3,20-dione.

Oily injection solutions:
    (a) Active ingredient _____ mg__ 5
    Olive oil _____ ml__ 2
    (b) Active ingredient _____ mg__ 50
    Oliver oil _____ ml__ 2

Tablet formulation:
    Active ingredient _____ 5
    Lactose _____ 71
    Corn starch _____ 71
    Talc _____ 2.7
    Magnesium stearate _____ 0.3

Total weight _____ 150.0

We claim:
1. A compound of the formula

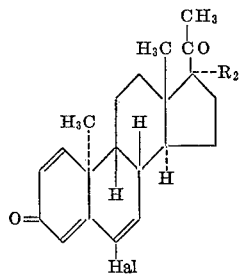

in which $R_2$ is lower alkyl and Hal is fluorine, chlorine or bromine.

2. A compound as in claim 1 which is 6-chloro-17α-methyl-9β,10α-pregna-1,4,6-triene-3,20-dione.
3. A compound as in claim 1 which is 6-fluoro-17α-methyl-9β,10α-pregna-1,4,6-triene-3,20-dione.
4. A compound which is of the formula

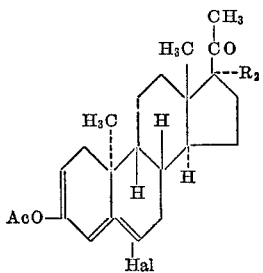

wherein $R_2$ is lower alkyl; Hal is fluorine, chlorine or bromine and Ac is the residue of a carboxylic acid having from one to twenty carbon atoms.

5. A compound as in claim 4 which is 3-acetoxy-6-chloro-17α-methyl-9β,10α-pregna-2,4,6-trien-20-one.
6. A compound which is of the formula

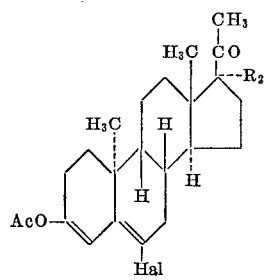

wherein $R_2$ is lower alkyl; Hal is fluorine, chlorine or bromine and Ac is the residue of a carboxylic acid having from one to twenty carbon atoms.

7. A compound as in claim 6 which is 3-acetoxy-6-chloro-17α-methyl-9β,10α-pregna-3,5-dien-20-one.

References Cited
UNITED STATES PATENTS
3,373,172   3/1968   Reerink et al. ____ 260—397.45

OTHER REFERENCES
Weiss et al., "Chemistry and Industry" (1963), pages 118–19 relied on.

ELBERT L. ROBERTS, Primary Examiner

U.S. Cl. X.R.
260—239.55, 397.4; 424—242

UNITED STATES PATENT OFFICE
CERTIFICATE OF CORRECTION

PO-1050
(5/69)

Patent No. 3,481,956    Dated December 2, 1969

Inventor(s) Furst and Müller

It is certified that error appears in the above-identified patent and that said Letters Patent are hereby corrected as shown below:

Column 9, Line 31

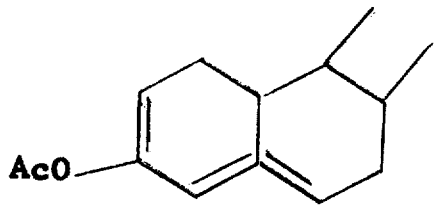

should be

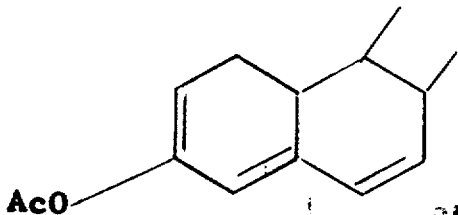

SIGNED AND
SEALED
SEP 22 1970

(SEAL)
Attest:

Edward M. Fletcher, Jr.
Attesting Officer

WILLIAM E. SCHUYLER, JR.
Commissioner of Patents